(No Model.)
H. C. HART.
COAT HOOK.
No. 456,030. Patented July 14, 1891.
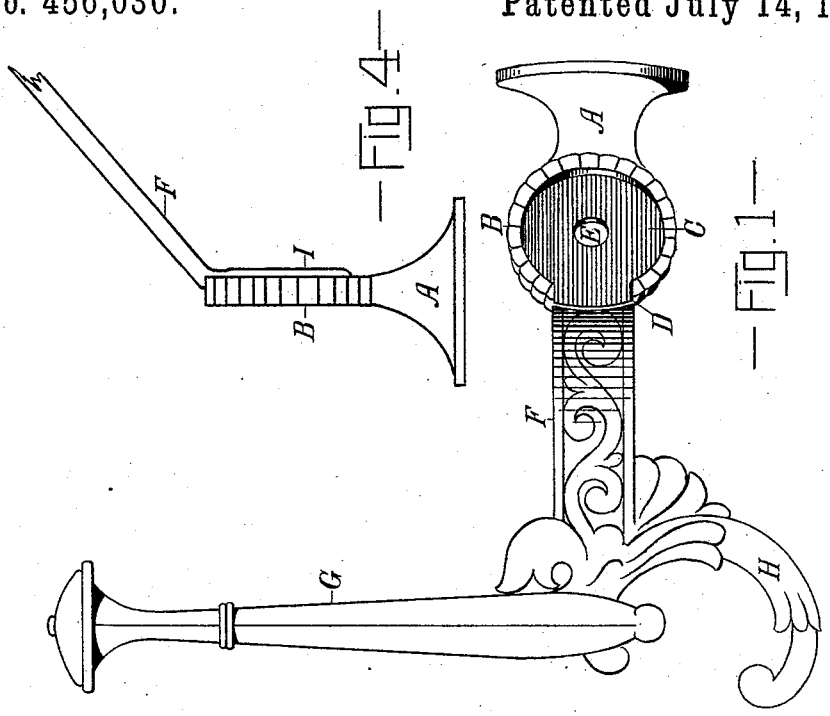
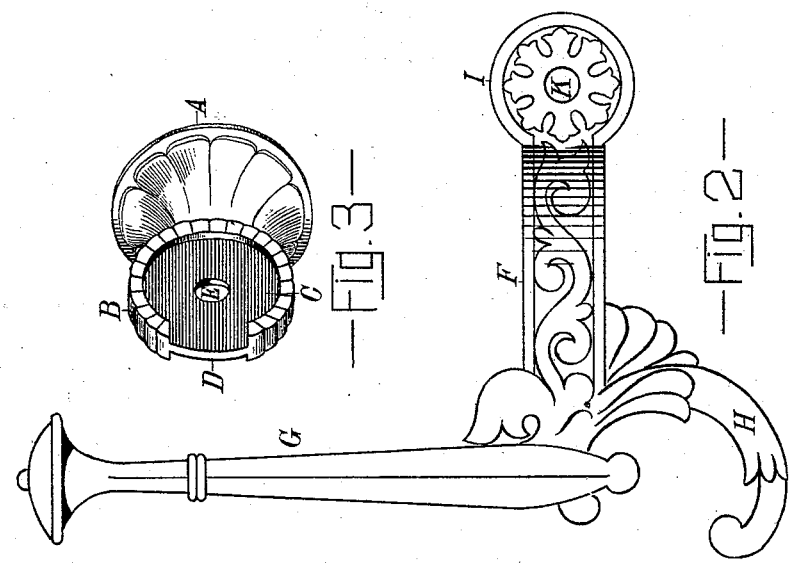
WITNESSES
William J. Swan
Gertrude H. Anderson
INVENTOR
Henry C. Hart

UNITED STATES PATENT OFFICE.

HENRY C. HART, OF DETROIT, MICHIGAN.

COAT-HOOK.

SPECIFICATION forming part of Letters Patent No. 456,030, dated July 14, 1891.

Application filed November 18, 1890. Serial No. 371,838. (No model.)

*To all whom it may concern:*

Be it known that I, HENRY C. HART, of Detroit, in the county of Wayne and State of Michigan, have invented a new and useful Improvement in Coat-Hooks, of which the following is a specification.

My invention consists in an improvement in coat-hooks, hereinafter fully described and claimed.

Figure 1 is a side elevation with one of the hooks removed. Fig. 2 is a side elevation of one hook. Fig. 3 is a perspective of the bracket. Fig. 4 is a plan view of the bracket with a portion of one hook attached.

It is exceedingly difficult and commercially almost impracticable to cast double coat-hooks in a single piece unless they are made of a ductile metal which can be bent into shape after being cast; and the object of my improvement is to simplify and cheapen the production of such hooks.

A represents a bracket adapted to be fastened to a wall or article of furniture and carrying the hooks. The bracket A is provided with a hub B, both sides of which are countersunk, as shown at C, and having the rim cut away on each side, as indicated at D, the opening left being of the same width as the shank F of the hook.

E represents a hole through the center of hub B, through which a rivet passes to hold the three parts of the hook firmly together. The hook is composed of a disk I, adapted to fit within the countersunk portion C of the hub B, and having therein a hole K to register with the hole E, and at the end of the shank is a depending hook H and an upright hook G, or either of these, as may be desired. The shank F of the hook is made to fit in the opening D of the hub B and is joined to the disk I at an angle, as shown in Fig. 4, to separate the two hooks.

The bracket and hooks are cast separately, which is a very simple operation, and are assembled by placing the disks I of the two hooks within the countersunk portions C of the hub B, the shanks F projecting through the openings D, then passing a rivet through the holes E K, and riveting the whole firmly together. By this construction the whole hook can be readily and cheaply made of cast-iron.

Instead of casting the bracket and coat-hooks separately, one of the hooks may be cast integral with the bracket, when the casting will have the appearance shown in Fig. 1, and the other hook may be cast separately and riveted to the bracket and hook which is integral therewith.

What I claim as my invention, and desire to secure by Letters Patent, is—

1. A coat-hook consisting of a bracket having a countersunk hub with openings at the side to fit the shanks of the hooks, and two hooks having their shanks adapted to fit the openings in the hub and terminating in disks adapted to fit the countersunk portion of the hub, the whole being joined by a rivet, substantially as shown and described.

2. A coat-hook consisting of a bracket A, having a countersunk hub B, and a hook having a shank F provided with a disk I, arranged in the countersink of the hub and rigidly attached thereto, substantially as described.

HENRY C. HART.

Witnesses:
CYRUS E. LOTHROP,
GERTRUDE H. ANDERSON.